(12) United States Patent
Stradella et al.

(10) Patent No.: US 7,637,227 B2
(45) Date of Patent: Dec. 29, 2009

(54) INDICATOR FOR A POWDER OR FLUID DISPENSER DEVICE

(75) Inventors: Fabio Stradella, Camogli (IT);
Giuseppe Stradella, Camogli (IT)

(73) Assignee: Valois S.A.S., Le Neubourg (FR)

( * ) Notice: Subject to any disclaimer, the term of this patent is extended or adjusted under 35 U.S.C. 154(b) by 261 days.

(21) Appl. No.: 11/587,663

(22) PCT Filed: Apr. 25, 2005

(86) PCT No.: PCT/FR2005/050277

§ 371 (c)(1),
(2), (4) Date: Oct. 3, 2007

(87) PCT Pub. No.: WO2005/111927

PCT Pub. Date: Nov. 24, 2005

(65) Prior Publication Data
US 2008/0251004 A1 Oct. 16, 2008

(30) Foreign Application Priority Data
Apr. 29, 2004 (FR) .................................. 04 04594

(51) Int. Cl.
*G06M 1/24* (2006.01)
*G01F 11/00* (2006.01)
*A61J 7/02* (2006.01)

(52) U.S. Cl. .................... 116/307; 116/298; 116/318; 128/205.23

(58) Field of Classification Search ................ 116/298, 116/299, 300, 307, 309, 312, 315, 316, 317, 116/318; 128/205.23, 200.25, 200.14; 222/36, 222/38; 235/91 R
See application file for complete search history.

(56) References Cited

U.S. PATENT DOCUMENTS

| | | | |
|---|---|---|---|
| 6,752,153 B1 | 6/2004 | Eckert | |
| 6,789,497 B1 * | 9/2004 | Aiken | .......................... 116/308 |
| 6,953,039 B2 * | 10/2005 | Scarrott et al. | .......... 128/200.14 |
| 7,137,391 B2 * | 11/2006 | Bruna | .................... 128/205.23 |
| 2006/0151524 A1 * | 7/2006 | Stradella et al. | ................ 222/23 |
| 2007/0210102 A1 * | 9/2007 | Stradella et al. | ................ 222/36 |
| 2008/0041877 A1 * | 2/2008 | Stradella et al. | ................ 222/30 |

(Continued)

FOREIGN PATENT DOCUMENTS

WO     WO 00/09187 A1     2/2000

(Continued)

*Primary Examiner*—R. A. Smith
(74) *Attorney, Agent, or Firm*—Sughrue Mion, PLLC

(57) ABSTRACT

An indicator for a powder or fluid dispenser device, the indicator including an indicator system and said indicator system comprising: a cover (1) provided with a viewing window (60); a first indicator element (2) that turns about an axis, said first indicator element (2) including first indicator means (120, 121); a second indicator element (5) that turns about an axis, said second indicator element (5) including second indicator means (50); and an interconnection element (3) that interconnects said first and second indicator elements (2, 5), in such a manner that it is the indicator means (120, 121; 50) of one of said two indicator elements (2, 5) that are visible initially in said viewing window (60) up to a predetermined number of actuations, after which it is the indicator means (50; 120, 121) of the other of said two indicator elements (2, 5) that become visible in the viewing window.

19 Claims, 4 Drawing Sheets

U.S. PATENT DOCUMENTS

2008/0173669 A1 * 7/2008 Pocock et al. .................. 222/36

FOREIGN PATENT DOCUMENTS

| WO | WO 01/31578 A1 | 5/2001 |
| WO | WO 01/37909 A1 | 5/2001 |
| WO | WO 03/080162 A1 | 10/2003 |
| WO | WO 2005114563 A1 * | 12/2005 |

* cited by examiner

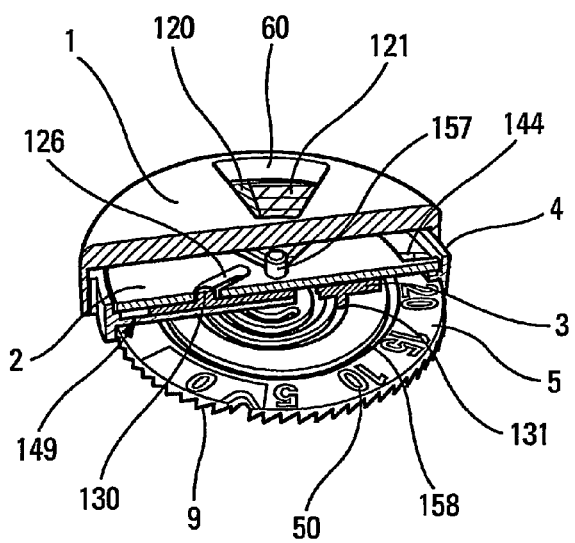
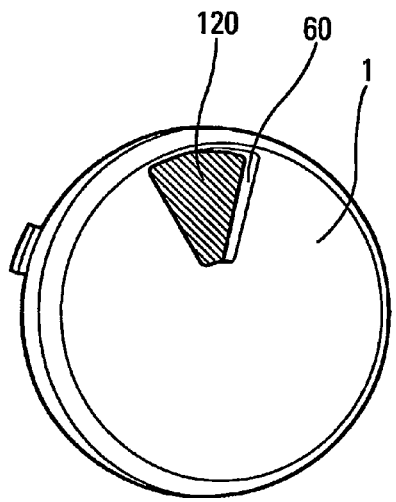
Fig. 4          Fig. 5
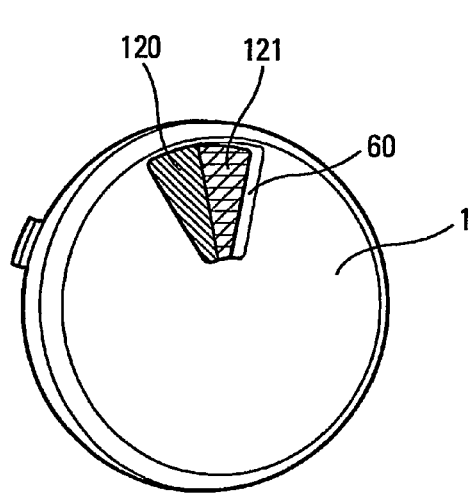
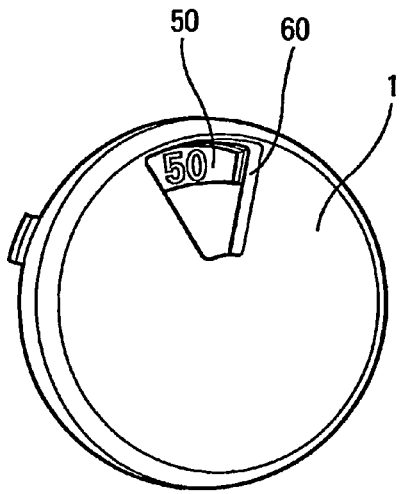
Fig. 6          Fig. 7

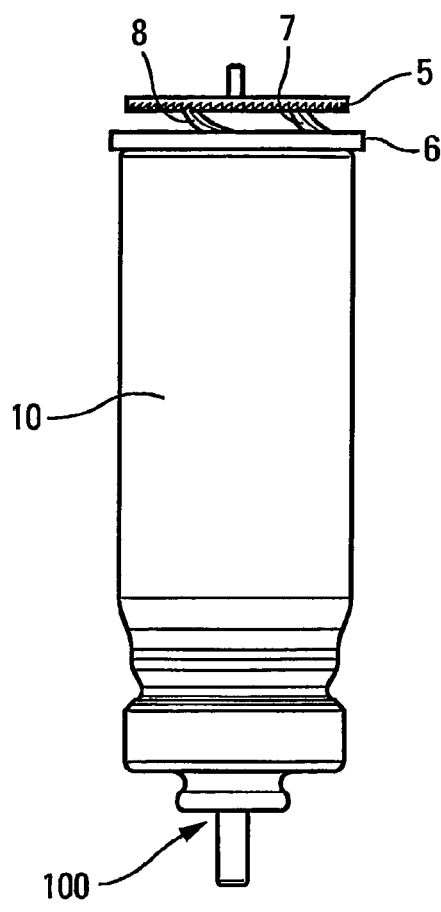
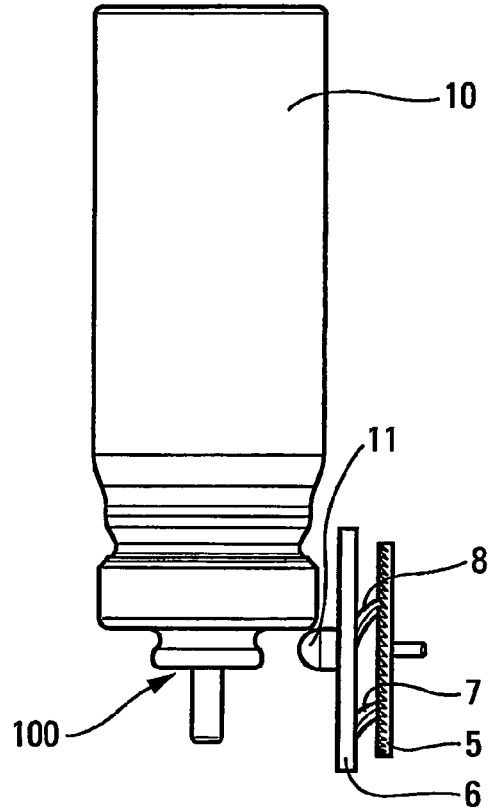
Fig. 8
Fig. 9

INDICATOR FOR A POWDER OR FLUID DISPENSER DEVICE

The present invention relates to an indicator, and more particularly to a dose indicator for a fluid dispenser device, for indicating to the user the number of doses that have been dispensed or that remain to be dispensed from the reservoir of said device.

The use of such indicators, which can be dose counters, for example, is well known in the prior art. Problems exist with such devices, in particular, when they are used with dispenser devices of the Metered Dose Inhaler (MDI) type, i.e. devices of the aerosol type including a reservoir containing fluid or powder, and a propellant gas, and a metering valve mounted on said reservoir. In particular, one problem relates to the dimensions of the counter. Such MDI devices generally contain a large number of doses, e.g. two hundred, and the aim is to keep the dimensions of the counter or of the indicator as small as possible, while guaranteeing an accurate reading, for the user, of the doses that have been dispensed or that remain to be dispensed. In particular, this is important with pharmaceuticals that may be used by the elderly or by children who find it more difficult to read numbers if they are very small. Indicators or counters of the circular type, i.e. including rotary elements, have already been proposed, and such systems make it possible to fulfill the requirement of being compact. However, in order to be suitable for counting a large number of doses, they are generally complex to make, and it is generally necessary to use indicator elements that, during operation, extend laterally or longitudinally beyond said counter, thereby making it impossible to fasten such a counter on the bottom of the reservoir of the device. In addition, when the counter is disposed on the side of the reservoir, it is generally necessary to provide a relatively large gap, so as to enable the elements to be accommodated while the counter is operating.

In addition, most existing counters or indicators count, in regular manner, the number of doses that have been dispensed or that remain to be dispensed from start to finish. Unfortunately, the essential function of a dose counter is to avoid the user ending up with an empty device without having been informed. Consequently, it is specifically the counting of the last few doses that remain to be dispensed that is crucial, so as to inform the user that the device is approaching the end of its life.

An object of the present invention is to provide an indicator, in particular a dose counter, that does not have the above-mentioned drawbacks.

More particularly, an object of the present invention is to provide such an indicator that is simple, compact, and thus inexpensive to manufacture and to assemble, that is certain and reliable in operation, and that can be disposed in particular on the bottom of the reservoir or on the side of said reservoir regardless of the type of powder or fluid dispenser device.

Another object of the present invention is to provide such an indicator that indicates, in progressive manner, the number of doses that have been dispensed or that remain to be dispensed, by informing the user, in particularly clear manner, when the device is approaching the end of its life.

The present invention thus provides an indicator for a powder or fluid dispenser device, the indicator including an indicator system and said indicator system comprising: a cover provided with a viewing window; a first indicator element that turns about an axis, said first indicator element including first indicator means; a second indicator element that turns about an axis, said second indicator element including second indicator means; and an interconnection element that interconnects said first and second indicator elements, in such a manner that it is the indicator means of one of said two indicator elements that are visible initially in said viewing window up to a predetermined number of actuations, after which it is the indicator means of the other of said two indicator elements that become visible in the viewing window.

Advantageously, said interconnection element is displaceable, in particular in translation, between said first and second indicator elements.

Advantageously, said first and second indicator elements are rotary disks, said interconnection element being a thin plate that is received in guide means for providing guidance in translation.

In a first variant embodiment, said guide means are formed by a guide disk that is interposed between said first and second indicator elements.

In a second variant embodiment, said guide means are formed by the cover.

Advantageously, said interconnection element includes at least one first projection that co-operates with the first indicator element, and at least one second projection that co-operates with the second indicator element.

Advantageously, said first projection co-operates with a slot, a groove, or a rail that is provided in the first indicator element, and said second projection co-operates with a guide slot, a guide groove, or a guide rail that is provided in the second indicator element.

Advantageously, said guide groove of the second indicator element comprises a first portion that extends in approximately spiral manner from the center, and a second portion that extends in approximately circular manner at the periphery of said second indicator element, turning said indicator element causing said interconnection element to be displaced in translation until said second projection co-operates with said circular second portion of the guide groove.

Advantageously, any displacement of the interconnection element causes the first indicator element to turn.

Advantageously, in the turning direction of said first indicator element, said first indicator element includes first indicator means, followed by a window.

Advantageously, said second indicator element includes second indicator means, in particular numbers and/or symbols.

Advantageously, said second indicator means are disposed around the periphery of said second indicator element.

Advantageously, said first indicator means of the first indicator element are visible initially in the viewing window of the cover until said first indicator element has turned sufficiently for its window to be in register with the viewing window of the cover, thereby making it possible to view the second indicator means of the second indicator element through said windows.

Advantageously, said cover and said first indicator element are mounted on a central axial pin of the second indicator element, said interconnection element including a longitudinal opening through which said pin passes.

Advantageously, said indicator further includes actuator means that are adapted to cause said second indicator element to turn at each actuation.

The present invention also provides a powder or fluid dispenser device comprising a reservoir, and a dispenser member, such as a pump or a valve, assembled on said reservoir, said device including an indicator as described above.

In a first embodiment, said indicator is fastened on the bottom wall of the reservoir remote from said dispenser member.

In a second embodiment, said indicator is disposed on the side of said reservoir.

Other characteristics and advantages of the present invention appear more clearly from the following detailed description, given by way of non-limiting example, and with reference to the accompanying drawings, and in which:

FIG. 4 is an assembled view of the device shown in FIGS. 2 and 3;

FIGS. 5 to 7 are diagrammatic plan views respectively showing the display that is seen by the user at the beginning, in the middle, and towards the end of use of the device;

FIG. 8 is a very diagrammatic cross-section view of a fluid dispenser device including an indicator of the invention, constituting a first embodiment; and FIG. 9 is a view similar to the view in FIG. 8, but showing a second embodiment.

Figure 1:
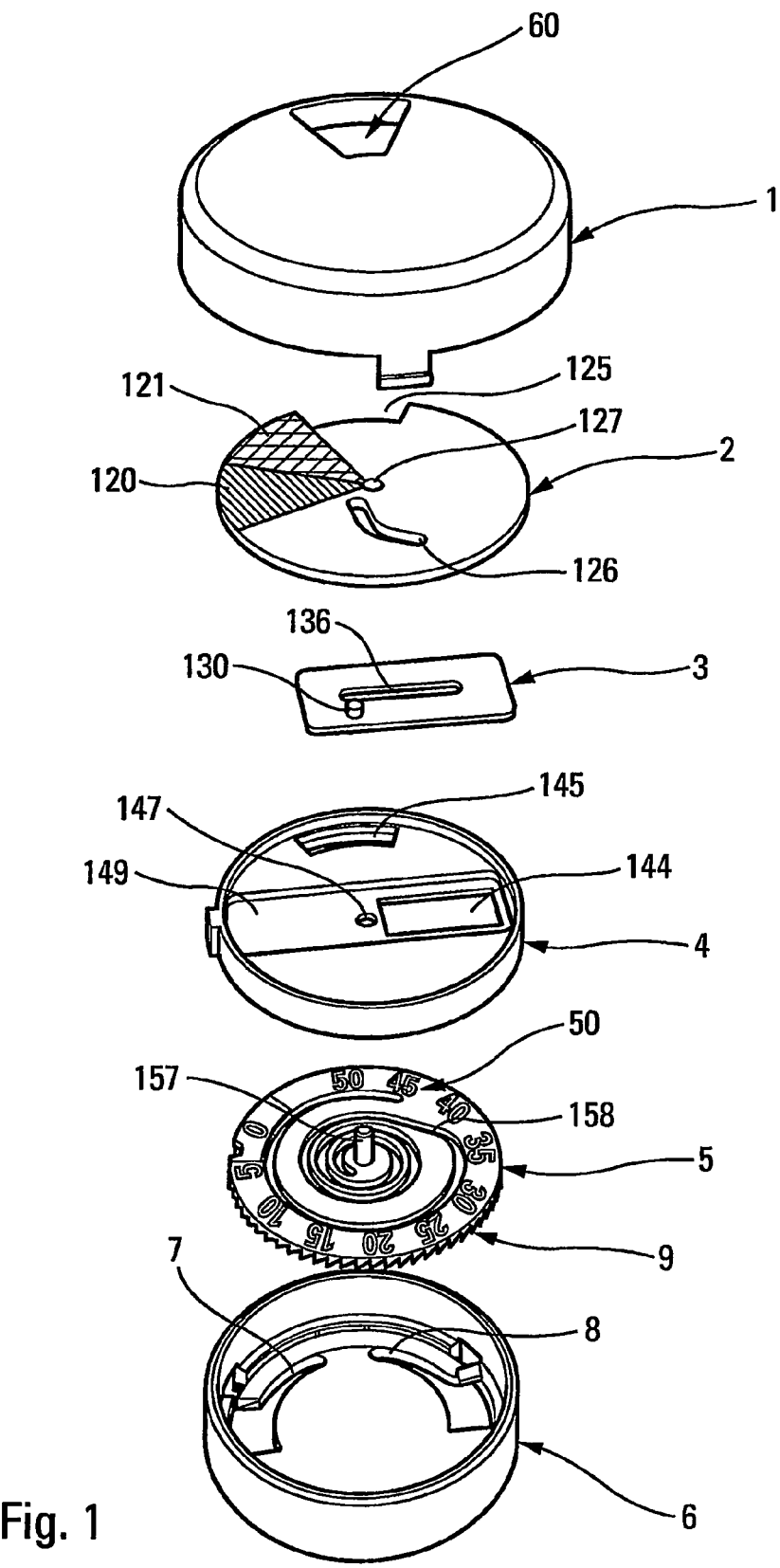
FIG. 1 is a diagrammatic exploded view in perspective of an indicator constituting a particular embodiment of the present invention.

Reference is made to FIGS. 1 to 4, which show a particular embodiment of the indicator of the present invention. Naturally this embodiment is given merely by way of particular example, and it is not limiting for the present invention. In general, the indicator includes a cover 1, provided with a viewing window 60, in which there are housed a certain number of elements that are described in greater detail below. Actuator means are provided to actuate the indicator, the actuator means being of any kind, with the present invention not being concerned by the kind, the shape, or the functioning of the actuator means. In the embodiment shown, the actuator means include a drive element 6 provided with two resilient tabs 7, 8 that are adapted to cause a portion of the indicator to turn, as described below. Naturally, other drive or actuator means can be envisaged.

Reference is made briefly below to FIGS. 8 and 9, which show two different embodiments of a powder or fluid dispenser device incorporating an indicator of the invention. In the embodiment in FIG. 8, the device includes a reservoir 10 on which there is assembled a dispenser member 100, the indicator being disposed on the bottom wall of said reservoir 10 remote from said dispenser member 100. In FIG. 9, the indicator is disposed on the side of said reservoir 10. It should thus be observed that with the indicator of the present invention, it is possible to dispose the indicator very easily in any desired position, including on the bottom of the reservoir 10, in simple manner, and without projecting outside the circumference of the reservoir itself. Here also, other positions can be envisaged for the indicator, the embodiments shown in FIGS. 8 and 9 are given only by way of illustration.

The description below describes in detailed manner an indicator system of the indicator, without entering into detail about the other component elements of the powder or fluid dispenser device.

With reference once again to FIGS. 1 to 4, the indicator includes a first indicator element 2, and a second indicator element 5, the first indicator element including first indicator means 120, 121, and the second indicator element including second indicator means 50.

In more detailed manner, the first indicator element 2 can be made in the form of a rotary disk including a central hole 127, and provided with two sectors 120, 121 that are identifiable to the user. By way of example, the sectors 120, 121 can be of different colors, but any other indicator means that are visible and identifiable to the user can be envisaged. In the turning direction of said first indicator element 2, the first indicator means 120, 121 are followed by a window 125. In addition, the indicator element 2 also includes a rail, a groove, or a slot 126 having a function that is described below.

The second indicator element 5 is also advantageously made in the form of a rotary disk, which, on one side, includes a set of teeth 9 for co-operating with the actuator means of the indicator. Thus, at each actuation of the fluid dispenser device on which the indicator is assembled, the drive means cause the second indicator element 5 to turn by co-operating with the set of teeth 9. On its opposite side, the second indicator element 5 includes the second indicator means 50 that are formed by numbers going from fifty to zero, in the embodiment shown. Advantageously, the numbers are disposed around the periphery of said second indicator element 5 for reasons that are explained below. Said second indicator element 5 further includes a central axial pin 157, and a profile made in the form of a guide groove, a guide slot, or a guide rail 158. The guide groove 158 preferably includes two distinct portions, a first portion that extends in spiral manner from the center of said second counter element 5, and that is connected to a second portion that is substantially circular, and that extends in the proximity of the periphery of said second indicator element 5.

An interconnection element 3 is disposed between said first and second indicator elements 2 and 5. The interconnection element 3 is preferably made in the form of a thin plate that is received in guide means 149 for providing guidance in translation, such that the interconnection element 3 is adapted to be displaced in translation in a direction that is perpendicular to the axis of rotation of said first and second indicator elements 2 and 5. Advantageously, as shown in FIGS. 1 to 4, the guide means 149 for providing guidance in translation can be formed by a guide disk that is interposed between said first and second indicator elements 2 and 5. In this configuration, the guide disk 4 further includes a viewing window 145, together with a central hole 147, and an opening 144 that extends approximately radially, and that is adapted to enable said interconnection element 3 to be displaced. In a variant, the guide means 149 for providing guidance in translation could be formed directly by the cover 1.

In the invention, the interconnection element 3 interconnects said first and second indicator elements 2, 5, in such a manner that it is the indicator means 120, 121 of the first indicator element 2 that are visible initially in the viewing window 60 up to a predetermined number of actuations, after which it is the indicator means 50 of the second indicator element 5 that become visible in the same viewing window 60 of the cover 1. Naturally, in a variant, the indicator elements 2 and 5 could be interchanged, in which event the indicator means of the second indicator element 5 could be viewed first, followed by the indicator means of the first indicator element 2.

Figures 2, 3:
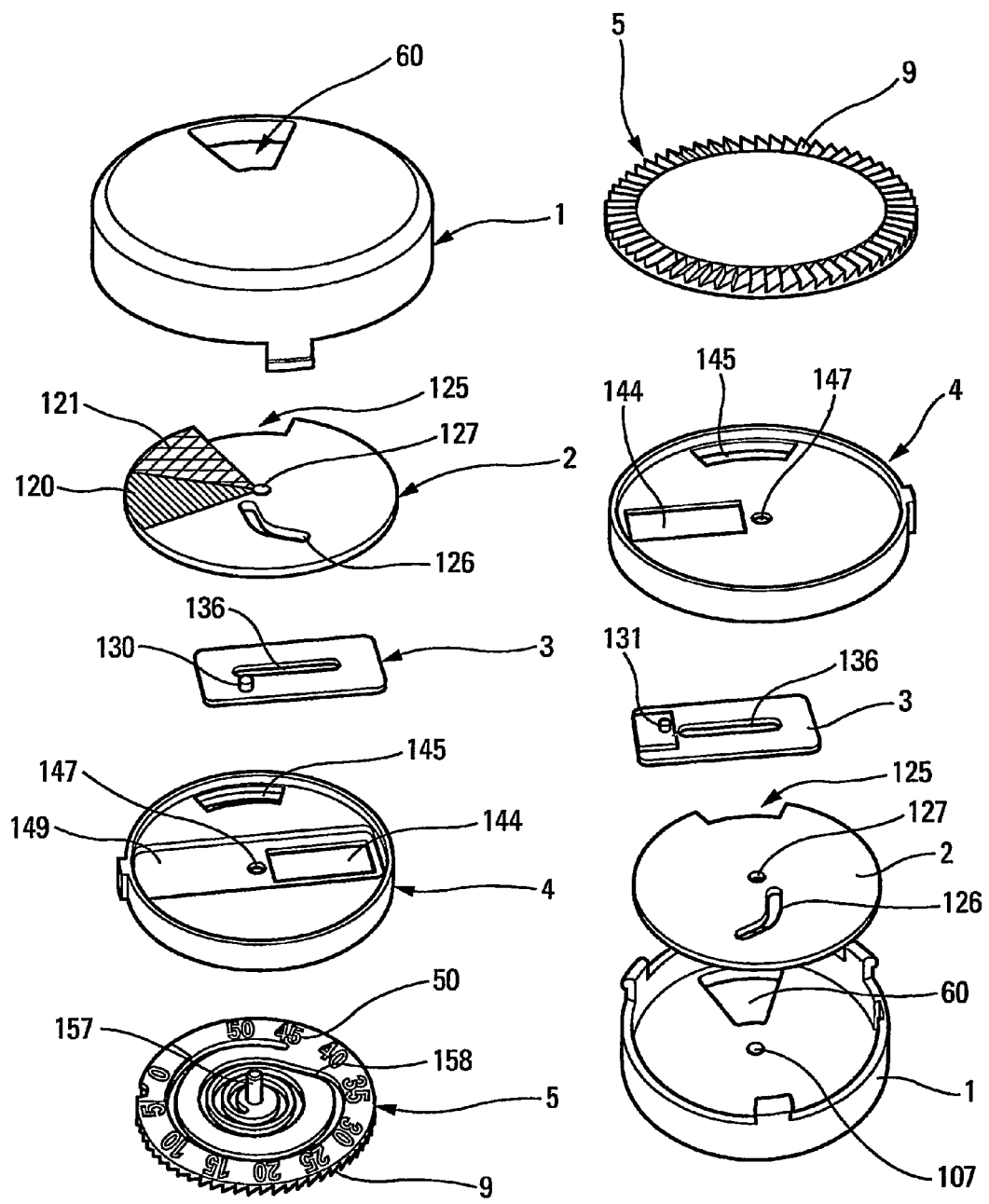
FIG. 2 is a view similar to the view in FIG. 1 showing, more particularly, the indicator system of the indicator as seen from above.
FIG. 3 is a view similar to the view in FIG. 2, but as seen from below.

In the embodiment shown, the interconnection element 3 includes a first projection 130 for co-operating with the slot 126 provided in the first indicator element 2. In addition, the interconnection element 3 also includes a second projection 131, as can be seen in FIG. 3, and thus disposed on the side opposite from the first projection 130, the second projection 131 being for co-operating with the guide groove 158 of the second indicator element 5. In the embodiment shown in the figures, the second projection 131 thus passes through the radial opening 144 of the guide disk 4. FIG. 4 shows the indicator of FIGS. 1 to 3 in its assembled state. It should be observed that the indicator element 2 and the cover 1 are mounted on the central axial pin 157 of the second indicator element 5, the pin passing through the central hole 127 of the first indicator element 2, and being received in a blind hole 107 provided in the bottom of the cover 1. The interconnection element 3 includes a longitudinal opening 136 through which the pin 157 can pass, such that said interconnection element can slide in translation about the central pin 157. In addition, if a guide disk 4 is used, said guide disk is also assembled about said central pin 157 by means of its central hole 147.

When the indicator is assembled, the first projection 130 of the interconnection element 3 is disposed in the slot 126 of the first indicator element 2, on one side thereof, and the second projection 131 of said interconnection element 3 is disposed in said guide groove 158 of the second indicator element 5, at the end of the first portion of said groove 158 that extends in spiral manner from the center. When the user actuates the indicator, the second indicator element 5 turns about an axis that is parallel to, and in particular that coincides with, the central pin 157. This turning movement causes the interconnection element 3 to be displaced in translation as a result of the second projection 131 being housed in the spiral portion of the groove 158 of the second indicator element 5, and as a result of the interconnection element 3 co-operating with the guide means 149 for providing guidance in translation. This displacement in translation of the interconnection element 3 causes the first indicator element 2 to turn as a result of the co-operation between the first projection 130 of the interconnection element 3 and the slot 126 of the first indicator element 2. Thus, with reference below to FIGS. 5 to 7, it should be observed that FIG. 5 shows the display that is seen by the user before the indicator is used for the first time. The viewing window 60 of the cover 1 shows the first sector 120 that is provided on the first indicator element 2. As the user actuates the indicator, the first indicator element 2 turns relative to said cover 1 about the central pin 157 of the second indicator element 5. This is shown in FIG. 6 which shows the display that is seen by the user after about half the doses contained in the dispenser have been dispensed. When the second projection 131 of the interconnection element 3 reaches the circular portion of the guide groove 158, any additional turning of the second indicator element does not cause any movement in translation of the interconnection element 3, said interconnection element thus having reached its end position. From that moment on, the interconnection element does not move any further during subsequent actuations. Simultaneously, the first projection 130 has displaced the first indicator element 2 through both sectors 120, 121 in full, and has brought the window 125 into register with the viewing window 60 of the cover 1. From that moment on, the indicator means 50, in this example the numbers, can thus be seen by the user through both windows 60 and 125, as can be seen in FIG. 7. Advantageously, the first indicator element 2 can be a bright color, e.g. red, and the window 125 of the first indicator element can have a radial dimension that is less than the radial dimension of the viewing window 60 of the cover 1. In this configuration, when the numbers 50 of the second indicator element 5 appear in the viewing window 60, they are combined with the red surface of the first indicator element 2, which indicates to the user that a crucial position has been reached, in which only a few doses remain available. In addition, on arriving in the proximity of the number zero, indicating that there is nothing more to be dispensed, the surface of the second indicator element 5 on which the numbers are marked can also be modified, e.g. colored in a bright color so as to attract the attention of the user still further. The display is thus particularly reliable and visible to the user. The transition between displaying the first indicator means 120, 121 of the first indicator element 2 and the second indicator means 50 of the second indicator element 5 takes place quickly because of the angle provided in the slot 126 of the second indicator element 2. In this configuration, in three or four actuations, the entire window 125 is in register with the viewing window 60 of the cover 1, whereas the angular rotation of the first indicator element 2 at the sectors 120, 121 takes place very slowly (in this event over one hundred and fifty doses if it is considered that the device contains two hundred doses to begin with). More generally, the shape of the slot 126 predetermines the turning characteristics of the first indicator element 2 relative to the second indicator element 5. This shape can be adapted as desired as a function of requirements. It is thus very easy to adapt or to modify the display characteristics of the indicator of the invention.

An advantage of the present invention is that the presence of the interconnection element 3 does not modify the outside dimensions of the indicator, said indicator being able to have a diameter that is approximately equal to the diameter of the reservoir, such that it can be assembled easily on its bottom wall. The interconnection element 3 slides between the two indicator elements 2, 5, without ever extending laterally beyond the circumference of the indicator elements.

Naturally, the various elements described above can be modified by the person skilled in the art, without going beyond the ambit of the present invention. In particular, the shape of the guide rails, the guide grooves, or the guide slots 126, 158 could be different, just as different colors, signs, symbols, or any other indicator means could be used in place of those shown. In addition, the first indicator element 2 could include more than one window if it is desirable to display a plurality of indicator means provided on the second indicator element 5. Finally, as explained above, the presence of the guide disk 4 is not necessary, and the interconnection element 3 could include projections that are capable of passing through the first indicator element 2, and that are capable of co-operating with suitable guide means formed in the cover 1.

Other variants and modifications can also be envisaged, without going beyond the ambit of the present invention, as defined by the accompanying claims.

The invention claimed is:

1. An indicator for a powder or fluid dispenser device, the indicator including an indicator system and being characterized in that said indicator system comprises:

a cover (1) provided with a viewing window (60);

a first indicator element (2) that turns about an axis, said first indicator element (2) including first indicator means (120, 121, 125);

a second indicator element (5) that turns about an axis, said second indicator element (5) including second indicator means (50); and an interconnection element (3) that interconnects said first and second indicator elements (2, 5), in such a manner that it is the indicator means (120, 121; 50) of only one of said two indicator elements (2, 5) that is visible initially in said viewing window (60) up to a predetermined number of actuations, after which it is the indicator means (50; 120, 121) of the other of said two indicator elements (2, 5) that becomes visible in the viewing window.

2. An indicator according to claim 1, in which said interconnection element (3) is displaceable, in particular in translation, between said first and second indicator elements (2, 5).

3. An indicator according to claim 1, in which said first and second indicator elements (2, 5) are rotary disks, said interconnection element (3) being a thin plate that is received in guide means (149) for providing guidance in translation.

4. An indicator according to claim 3, in which said guide means (149) are formed by a guide disk (4) that is interposed between said first and second indicator elements (2, 5).

5. An indicator according to claim 3, in which said guide means are formed by the cover (1).

6. An indicator according to claim 1, in which said interconnection element (3) includes at least one first projection (130) that co-operates with the first indicator element (2), and at least one second projection (131) that co-operates with the second indicator element (5).

7. An indicator according to claim 6, in which said first projection (130) co-operates with a slot, a groove, or a rail (126) that is provided in the first indicator element (2), and said second projection (131) co-operates with a guide slot, a guide groove, or a guide rail (158) that is provided in the second indicator element (5).

8. An indicator according to claim 7, in which said guide groove (158) of the second indicator element (5) comprises a first portion that extends in approximately spiral manner from the center, and a second portion that extends in approximately circular manner at the periphery of said second indicator element (5), turning said indicator element (5) causing said interconnection element (3) to be displaced in translation until said second projection (131) co-operates with said circular second portion of the guide groove (158).

9. An indicator according to claim 8, in which any displacement of the interconnection element (3) causes the first indicator element (2) to turn.

10. An indicator according to claim 1, in which, in the turning direction of said first indicator element (2), said first indicator element (2) includes first indicator means (120, 121), followed by a window (125).

11. An indicator according to claim 10, in which said first indicator means (120, 121) of the first indicator element (2) are visible initially in the viewing window (60) of the cover (1) until said first indicator element (2) has turned sufficiently for its window (125) to be in register with the viewing window (60) of the cover (1), thereby making it possible to view the second indicator means (50) of the second indicator element (5) through said windows (125, 60).

12. An indicator according to claim 1, in which said second indicator element (5) includes second indicator means (50), in particular numbers and/or symbols.

13. An indicator according to claim 12, in which said second indicator means (50) are disposed around the periphery of said second indicator element (5).

14. An indicator according to claim 1, in which said cover (1) and said first indicator element (2) are mounted on a central axial pin (157) of the second indicator element (5), said interconnection element (3) including a longitudinal opening (136) through which said pin (157) passes.

15. An indicator according to claim 1, in which said indicator further includes actuator means that are adapted to cause said second indicator element (5) to turn at each actuation.

16. A powder or fluid dispenser device comprising a reservoir (10), and a dispenser member (100) assembled on said reservoir (10), the device being characterized in that it includes an indicator according to claim 1.

17. A device according to claim 16, in which said indicator is fastened on the bottom wall of the reservoir (10) remote from said dispenser member (100).

18. A device according to claim 16, in which said indicator is disposed on the side of said reservoir (10).

19. A device according to claim 16, wherein the dispenser member is a pump or a valve.

* * * * *